US011035047B2

(12) United States Patent
Honkawa et al.

(10) Patent No.: US 11,035,047 B2
(45) Date of Patent: Jun. 15, 2021

(54) ELECTROLYTIC ALUMINUM FOIL AND METHOD OF MANUFACTURING SAME

(71) Applicant: UACJ CORPORATION, Tokyo (JP)

(72) Inventors: Yukio Honkawa, Tokyo (JP); Junji Nunomura, Tokyo (JP); Yoichi Kojima, Tokyo (JP); Koichi Ui, Tokyo (JP)

(73) Assignee: UACJ Corporation, Tokyo (JP)

( * ) Notice: Subject to any disclaimer, the term of this patent is extended or adjusted under 35 U.S.C. 154(b) by 0 days.

(21) Appl. No.: 16/418,926

(22) Filed: May 21, 2019

(65) Prior Publication Data

US 2019/0276945 A1  Sep. 12, 2019

Related U.S. Application Data

(63) Continuation of application No. PCT/JP2017/041916, filed on Nov. 22, 2017.

(30) Foreign Application Priority Data

Nov. 22, 2016  (JP) .............................. JP2016-226650

(51) Int. Cl.
*C25D 1/00* (2006.01)
*C25D 1/04* (2006.01)
*C25D 3/66* (2006.01)

(52) U.S. Cl.
CPC ................. *C25D 1/04* (2013.01); *C25D 1/00* (2013.01); *C25D 3/66* (2013.01); *C25D 3/665* (2013.01)

(58) Field of Classification Search
CPC ... C25D 1/04; C25D 1/00; C25D 3/66; C25D 3/665; H01M 4/661
See application file for complete search history.

(56) References Cited

U.S. PATENT DOCUMENTS

2014/0346050 A1  11/2014  Sakaida et al.
2017/0002474 A1   1/2017  Nishimura et al.

FOREIGN PATENT DOCUMENTS

| CN | 104053824 A | 9/2014 |
|---|---|---|
| CN | 105980606 A | 9/2016 |

(Continued)

OTHER PUBLICATIONS

PCT, "International Preliminary Report on Patentability", Application No. PCT/JP2017/041916, dated May 28, 2019, 10 pages.

(Continued)

*Primary Examiner* — Daniel J. Schleis
*Assistant Examiner* — Kevin CT Li
(74) *Attorney, Agent, or Firm* — Dorsey & Whitney LLP

(57) ABSTRACT

The present disclosure provides a high-quality electrolytic aluminum foil which includes a smooth surface and an end portion containing no dendritic deposit, and a method for producing the same which can obtain the electrolytic aluminum foil at a high collection rate. An electrolytic aluminum foil of the present disclosure includes a surface having an arithmetic average height (Sa) of 0.15 μm or less, wherein when, for a size of a crystal grain present in a cross-sectional surface, a first maximum dimension as measured in a thickness direction of the cross-sectional surface is x (μm), and a second maximum dimension as measured in a width direction of the cross-sectional surface is y (μm), x and y satisfy $(x+y)/2 \leq 3$ μm and $1 \leq x/y \leq 4$.

4 Claims, 1 Drawing Sheet

(56) References Cited

FOREIGN PATENT DOCUMENTS

| JP | H06-081191 | | 3/1994 | |
|---|---|---|---|---|
| JP | 2006169571 | A | 6/2006 | |
| JP | 2012230777 | A * | 11/2012 | |
| JP | 2014080632 | A * | 5/2014 | ............... C25D 3/66 |
| JP | 2014080632 | A | 5/2014 | |
| JP | 2014159606 | A * | 9/2014 | |
| JP | 2014159606 | A | 9/2014 | |
| WO | 2017038992 | A1 | 3/2017 | |

OTHER PUBLICATIONS

PCT, "Written Opinion of the International Search Authority", Application No. PCT/JP2017/041916, dated Jan. 16, 2018, 8 pages.
International Search Report dated Jan. 16, 2018 for PCT Application No. PCT/JP2017/041916, 7 pages.
English translation of Office Action for JP Application No. 2016-226650, dated Aug. 11, 2020.
English translation of Office Action for CN Application No. 201780055842.9, dated Nov. 16, 2020.
English translation of Office Action for CN Application No. 201780055842.9, dated Apr. 19, 2021.

* cited by examiner

[Fig. 1]
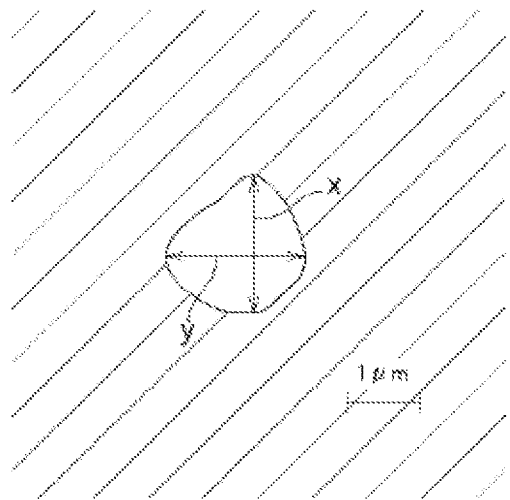
[Fig. 2]
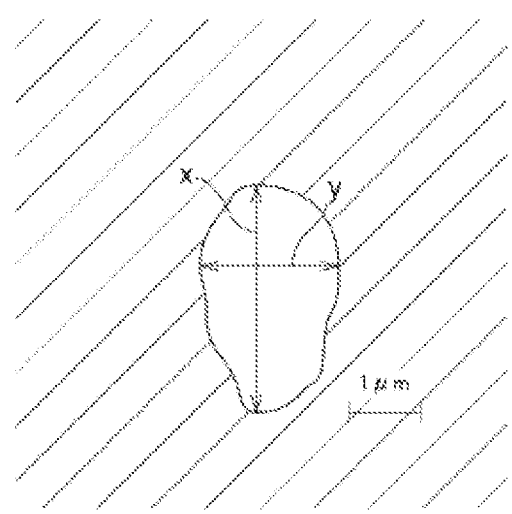

ELECTROLYTIC ALUMINUM FOIL AND METHOD OF MANUFACTURING SAME

CROSS REFERENCE TO RELATED APPLICATIONS

The present application is a continuation application of International Patent Application No. PCT/JP2017/041916 filed on Nov. 22, 2017, which claims priority to Japanese Patent Application No. 2016-226650, filed on Nov. 22, 2016. The contents of these applications are incorporated herein by reference in their entirety.

BACKGROUND

Technical Field

The present disclosure relates to a high-quality electrolytic aluminum foil and a method for producing the same.

Background Art

In recent years, the development of lithium ion batteries as batteries for automobiles and personal computers has advanced. In a lithium ion battery, an aluminum foil is used as a positive electrode current collector for the improvement of battery capacity.

The aluminum foil is conventionally produced by rolling an aluminum foil metal. The lower limit of the thickness of the aluminum foil produced by the rolling method is usually about 10 μm. However, in order to further increase the battery capacity of a lithium ion battery and make the lithium ion battery smaller, it is necessary to make the aluminum foil as thin as possible. Specifically, an aluminum foil having a thickness of 5 to 10 μm is required. Such an aluminum foil can also be produced by the rolling method, but it is necessary to increase the number of rolling steps, and thus a problem with the rolling method is that the production cost is comparatively high.

On the other hand, an electrolytic method makes it possible to produce an aluminum foil having a thickness as low as 5 to 10 μm in few steps. It is considered that if the method for producing the aluminum foil according to the electrolytic method is applied, an aluminum metal can be produced in a room temperature region. The electrolytic method makes it possible to efficiently electrodeposit a thick aluminum foil to produce an aluminum metal.

For example, Japanese Patent Application Laid-Open No. 2014-80632 discloses a method for producing an aluminum foil having a thickness of 10 μm or less according to an electrolytic method. This method is a method for producing an aluminum foil including: supplying an electrolytic solution containing a molten salt and electrodepositing aluminum on a drum serving as a cathode for electrolysis while rotating the drum in an electrolysis vessel including the drum, to form an aluminum film; and peeling off the aluminum film from the drum. Japanese Patent Application Laid-Open No. 6-81191 discloses a method for electroplating aluminum on a metal strip at a high current density using a plating liquid of a low-temperature molten salt.

However, the method of Japanese Patent Application Laid-Open No. 2014-80632 can produce aluminum foil having a thickness of 10 μm or less, but the quality and collection rate of the aluminum foil produced are not considered. If the aluminum foil is produced by prior art such as Japanese Patent Application Laid-Open No. 2014-80632, when the aluminum film is peeled off from the drum, the aluminum film is apt to fracture, or a part of the aluminum film is apt to flake off from the drum, which makes it difficult to continuously collect a high-quality aluminum foil. The method of Japanese Patent Application Laid-Open No. 6-81191 can increase the current density to thereby improve the production efficiency. However, as the current density is increased, aluminum is more nonuniformly plated on the metal strip, and a dendritic deposit is apt to occur in an end portion. When such a deposit occurs, a portion other than a portion in which the deposit has occurred is collected, which causes a decreased collection rate (yield).

SUMMARY

Then, the present disclosure has been made in view of the above circumstances, and it is an object of the present disclosure to provide a high-quality electrolytic aluminum foil which includes a smooth surface and an end portion containing no dendritic deposit, and a method for producing the electrolytic aluminum foil which can obtain the electrolytic aluminum foil at a high collection rate.

An electrolytic aluminum foil of the present disclosure includes a surface having an arithmetic average height (Sa) of 0.15 μm or less, wherein, when, for a size of a crystal grain present in a cross-sectional surface, a first maximum dimension as measured in a thickness direction of the cross-sectional surface is x (μm), and a second maximum dimension as measured in a width direction of the cross-sectional surface is y (μm), x and y satisfy the following formulas (1) and (2):

$$(x+y)/2 \leq 3 \text{ μm} \quad (1); \text{ and}$$

$$1 \leq x/y \leq 4 \quad (2).$$

A method for producing the electrolytic aluminum foil of the present disclosure includes: supplying an electrolytic solution into an electrolysis vessel including a cathode and an anode; electrodepositing an aluminum film on the cathode; peeling off the electrodeposited aluminum film from the cathode to provide the electrolytic aluminum foil, wherein the electrolytic solution contains a molten salt containing an alkylimidazolium halide and an aluminum halide, and 1,10-phenanthroline; a concentration of the 1,10-phenanthroline is 1 to 100 mM in the electrolytic solution; in electrodepositing the aluminum film, a temperature of the electrolytic solution is 50 to 100° C., and a current density is 10 to 100 mA/cm$^2$; and electrodepositing the aluminum film is performed under a condition where an inactive gas is injected at a flow rate of 50 to 250 cm/min between the cathode and the anode.

According to one aspect of the present disclosure, it is preferable that the inactive gas be argon.

According to one aspect of the present disclosure, it is preferable that an arithmetic average roughness (Ra) of the cathode be 0.10 to 0.40 μm.

The electrolytic aluminum foil of the present disclosure is a high-quality aluminum foil which includes a smooth surface and an end portion containing no dendritic deposit. In the method for producing the electrolytic aluminum foil according to the present disclosure, the aluminum foil can be obtained at a high collection rate without causing an aluminum film to break or flake off when the aluminum film is peeled off from a cathode.

BRIEF DESCRIPTION OF DRAWINGS

FIG. 1 is a diagram showing the cross-sectional surface of an aluminum foil of Example 1.

FIG. 2 is a diagram showing the cross-sectional surface of an aluminum foil of Comparative Example 5.

DESCRIPTION OF EMBODIMENTS

An electrolytic aluminum foil (hereinafter, merely described as "aluminum foil") according to the present disclosure includes a surface having an arithmetic average height (Sa) within a predetermined range, and the size of a crystal grain present in a cross-sectional surface is within a predetermined range. Hereinafter, the aluminum foil will be described in detail. The aluminum foil is produced by a production method to be described later, and obtained by peeling off an aluminum film deposited on a cathode. Herein, aluminum before peeling off is described as an "aluminum film", and aluminum after peeling off is described as an "aluminum foil". The characteristics of the aluminum film are equivalent to those of the aluminum foil.

(Aluminum Foil)

In the aluminum foil of the present disclosure, when, for the size of the crystal grain present in the cross-sectional surface, a first maximum dimension as measured in the thickness direction of the cross-sectional surface is x (μm), and a second maximum dimension as measured in the width direction of the cross-sectional surface is y (μm), x and y satisfy the following formulas (1) and (2):

$$(x+y)/2 \leq 3 \ \mu m \quad (1); \text{ and}$$

$$1 \leq x/y \leq 4 \quad (2).$$

Hereinafter, $(x+y)/2$ is described as an average diameter, and $x/y$ is described as an aspect ratio. The average diameter of the crystal grain present in the cross-sectional surface is preferably 1 to 3 μm, and more preferably 0.5 to 2 μm. The aspect ratio of the crystal grain present in the cross-sectional surface is preferably 1 to 3. The cross-sectional surface of the aluminum foil is obtained by cutting the aluminum foil from an any place on the surface of the aluminum foil toward the inside (the thickness direction of the aluminum foil). Therefore, the thickness direction of the cross-sectional surface is a direction substantially perpendicular to the surface of the aluminum foil, and the width direction of the cross-sectional surface is perpendicular to the thickness direction of the aluminum foil. When the aluminum foil is produced by a method for continuously collecting the aluminum foil using a drum-shaped cathode to be described later, a cutting direction is not particularly limited, and the aluminum foil may be cut in a direction parallel to the rotating direction of the cathode drum, or may be cut along a direction perpendicular to the rotating direction of the cathode drum. For example, the aluminum foil is irradiated with a focused ion beam from the surface of the aluminum foil toward the inside using a focused ion beam apparatus to acquire a secondary electron image of the cross-sectional surface of the aluminum foil. The cross-sectional surface of the aluminum foil can be analyzed by the obtained secondary electron image. In the secondary electron image, a plurality of any crystal grains are selected, and the first maximum dimension and second maximum dimension of each crystal grain are measured, to allow the average diameter and the aspect ratio to be calculated.

In the present disclosure, the average diameter of the crystal grain present in the cross-sectional surface is 1 to 3 μm, and the aspect ratio is 1 to 4, and thus the strength of the aluminum film is high. This can prevent the aluminum film from breaking or prevent a part of the aluminum film from flaking off from the cathode when the aluminum film is peeled off from the cathode.

The magnitude of the aspect ratio of the crystal grain present in the cross-sectional surface is an index of whether an aluminum deposit growing in a dendritic form is present in an end portion of the aluminum foil. A characteristic of the production of the aluminum foil according to an electrolytic method is that current concentration is apt to occur in the end portion of the aluminum foil. If the current concentrates on the end portion, the deposited aluminum grows in a dendritic form, the thickness of the aluminum foil in the end portion becomes extremely large, and the difference between the thicknesses of the aluminum foil in the end portion and the central portion becomes large. In such a case, the aluminum film tends to be apt to break when the aluminum film is peeled off from the cathode. When the aspect ratio of the crystal grain present in the cross-sectional surface of the aluminum foil is 1 to 4, the aluminum deposit growing in a dendritic form is not present in the end portion, which can provide the aluminum foil at a high collection rate.

When the average diameter of the crystal grain present in the cross-sectional surface is more than 3 μm, the strength of the material decreases, and collection of the aluminum foil becomes difficult, which is not preferable.

The arithmetic average height (Sa) of the surface of the aluminum foil of the present disclosure is 0.15 μm or less, and preferably 0.05 to 0.1 μm. When the arithmetic average height (Sa) is more than 0.15 μm, the aluminum film tends to be apt to break when the aluminum film is peeled off from the cathode. The arithmetic average height (Sa) is a parameter obtained by three-dimensionally extending an arithmetic average roughness (Ra) which is a two-dimensional parameter, and specified in ISO25178. The arithmetic average height (Sa) can be measured by analyzing a surface shape using an atomic force microscope.

The thickness of the aluminum foil is usually 1 μm to 20 μm, and may be appropriately selected depending on the application. For example, when the electrolytic aluminum foil is used as the positive electrode current collector of a lithium ion battery, it is preferable that the thickness be 10 μm or less.

(Method for Producing Aluminum Foil)

A method for producing an aluminum foil of the present disclosure includes: supplying an electrolytic solution into an electrolysis vessel; electrodepositing an aluminum film on a cathode; and peeling off the electrodeposited aluminum film from the cathode to provide the aluminum foil. Hereinafter, each of the steps will be described in detail.

(Supplying Electrolytic Solution into Electrolysis Vessel)

First, the electrolytic solution is supplied into the electrolysis vessel. In the present disclosure, the electrolytic solution contains a molten salt containing an alkylimidazolium halide and an aluminum halide, and 1,10-phenanthroline as an additive.

The standard electrode potential of aluminum is −1.662 V vs. SHE (standard hydrogen electrode). This usually makes it impossible to electrodeposit aluminum from an aqueous solution. As the electrolytic solution for electrodepositing aluminum, a molten salt as a mixture with an aluminum salt, or an organic solvent in which an aluminum salt is dissolved is used.

Molten salts can be broadly divided into inorganic molten salts and organic room temperature-type molten salts. In the present disclosure, as the organic room temperature-type molten salt, a molten salt containing an alkylimidazolium halide and an aluminum halide is used. The alkylimidazolium halide is, for example, alkylimidazolium chloride. Specific examples include 1-ethyl-3-methylimidazolium chloride (hereinafter described as "EMIC"). Specific examples of the aluminum halide include aluminum chloride (hereinafter described as "$AlCl_3$"). The melting point of a mixture of EMIC and $AlCl_3$ decreases to around $-50°$ C. depending on the composition. Therefore, the electrodeposition of aluminum can be carried out in a lower temperature environment. From the viewpoint of the viscosity and conductivity of the electrolytic solution, the combination of EMIC and $AlCl_3$ is most preferred. It is preferable that the molar ratio of EMIC to $AlCl_3$ ($EMIC:AlC_3$) be 2:1 to 1:2, and it is more preferable that the molar ratio be 1:1 to 1:2.

In the present disclosure, 1,10-phenanthroline as an additive is added to the molten salt. The concentration of 1,10-phenanthroline in the electrolytic solution is 1 to 100 mM, and preferably 5 to 50 mM. 1,10-phenanthroline has an effect of reducing the size of the crystal grain to increase the strength of the aluminum film. The increased strength of the aluminum film can prevent the aluminum film from fracturing or prevent a part of the aluminum film from flaking off from the cathode when the aluminum film is peeled off from the cathode, and the collection rate of the aluminum foil is improved. When the concentration of 1,10-phenanthroline is less than 1 mM, an effect of smoothing the surface of the aluminum foil becomes too small. On the other hand, when the concentration of 1,10-phenanthroline is more than 100 mM, the aluminum film becomes hardened rapidly, and accordingly the aluminum film becomes brittle. Therefore, the aluminum film is apt to flake off from the cathode, and the collection rate of the aluminum foil deteriorates. To the electrolytic solution, other additives in addition to 1,10-phenanthroline may be appropriately added. Examples of the other additives include benzene, toluene, and xylene.

(Electrodepositing Aluminum Film on Cathode)

In the present disclosure, electrodepositing the aluminum film is performed under conditions that the temperature of the electrolytic solution is 50 to 100° C.; the current density is 10 to 100 $mA/cm^2$; and an inactive gas is injected at a flow rate of 50 to 250 cm/min between the cathode and the anode. This makes it possible to electrodeposit the aluminum film on the cathode.

In the present disclosure, the temperature of the electrolytic solution is within the range of 50 to 100° C. More preferably, the temperature of the electrolytic solution is within the range of 60° C. to 80° C. When the temperature of the electrolytic solution is less than 50° C., the viscosity and resistance of the electrolytic solution increase, and thus the maximum current density becomes small. As a result, the electrodeposition efficiency decreases, and the deposition of the aluminum film is apt to become nonuniform. Specifically, more of aluminum deposits in a specific site such as a protruding part in the aluminum film, and a dendritic deposit is formed. This deposit flakes off from the cathode, and a collection rate tends to decrease. Since only the film thickness of the specific site becomes large, and the film thickness of the other portion becomes small, film formation efficiency (average film thickness/film formation time) also deteriorates. On the other hand, when the temperature of the electrolytic solution is more than 100° C., the composition of the electrolytic solution is unstable due to the volatilization and decomposition of the compounds forming the electrolytic solution. Particularly when a molten salt containing EMIC and $AlCl_3$ is used as the electrolytic solution, the volatilization of $AlCl_3$ and the decomposition of the 1-ethyl-3-methylimidazolium cation are significant. Furthermore, the energy for maintaining the temperature of the electrolytic solution is also high, and the deterioration of the electrolysis vessel is also promoted, and thus production efficiency decreases.

In the present disclosure, the current density is 10 to 100 $mA/cm^2$. The current density is preferably 20 to 100 $mA/cm^2$. The electrodeposition rate corresponds to the current density, and therefore when the current density is less than 10 $mA/cm^2$, the electrodeposition rate is too slow, which causes decreased production efficiency. On the other hand, when the current density is more than 100 $mA/cm^2$, more of aluminum deposits in a specific site such as a protruding part in the aluminum film, and a dendritic deposit is formed. This deposit flakes off from the cathode, and a collection rate tends to decrease.

In the present disclosure, the inactive gas is injected at a flow rate of 50 to 250 cm/min between the cathode and the anode. The inactive gas is injected at a predetermined flow rate to stir the electrolytic solution, thereby promoting the formation of the aluminum film. The flow rate is calculated by dividing the flow volume (L/min) of the inactive gas by a cross-sectional area between the cathode and the anode, assuming that the inactive gas passes through between the cathode and the anode. Since the flow rate of the inactive gas is changed by a distance between the cathode and the anode, and the width of the cathode, the flow volume of the inactive gas is adjusted based on the distance between the cathode and the anode, and the width of the cathode in order to supply the inactive gas at a desired flow rate.

When the flow rate of the inactive gas is less than 50 cm/min, more of aluminum deposits in a specific site such as a protruding part in the aluminum film, and a dendritic deposit is formed. This deposit flakes off from the cathode, and a collection rate tends to decrease. When the flow rate of the inactive gas is slower than 50 cm/min, the shape of the crystal grain becomes nonuniform, and the surface roughness value of the surface of the aluminum foil tends to become large. On the other hand, when the flow rate is faster than 250 cm/min, the aluminum film is apt to be peeled off from the cathode, which may block normal film formation. The shape of the crystal grain becomes nonuniform, whereby the surface roughness value of the surface of the aluminum foil tends to become large. A method for supplying the inactive gas is not particularly limited, and the inactive gas may be bubbled in the electrolytic solution. A pipe for introducing the inactive gas between the cathode and the anode may be inserted from above the solution level of the electrolytic solution, to inject the inactive gas. Examples of the inactive gas include nitrogen and argon, and argon is preferable in respect of reaction inactivity hardly providing reaction with other substances at all.

In the present disclosure, the anode is made of aluminum or an insoluble electrode. As the cathode, titanium, stainless steel, nickel, and carbon and the like are used. Metals such as titanium, stainless steel, and nickel are excellent in corrosion resistance because dense natural oxide films are formed on the surfaces. Due to the presence of the natural oxide films, adhesiveness to the aluminum film decreases, and therefore the metals are suitable as the cathode. Non-metallic materials such as carbon have low bonding force to the aluminum film, and are therefore suitable as the cathode. When large irregularities are present in part of the cathode surface, the deposited aluminum bites into the recession. When the aluminum film biting into the recession is peeled off from the cathode surface, high peel resistance occurs, and thus the aluminum foil is broken or cut. Such peel resistance is influenced by the surface roughness of the cathode. Therefore, it is preferable that the arithmetic average roughness (Ra) of the cathode surface is 0.10 to 0.40 µm, and the ten-point average roughness (Rz) is 0.20 to 0.70 µm. When the arithmetic average roughness (Ra) of the cathode surface is less than 0.10 μm, the aluminum film is apt to flake off during electrodeposition, which is not preferable. The cathode surface may be adjusted by mechanical polishing or electrolytic polishing.

(Peeling Off Deposited Aluminum Film from Cathode Surface to Provide Aluminum Foil)

In the present disclosure, the shapes of the anode and cathode are not particularly limited, and a plate-like anode and a plate-like cathode may be used. In order to continuously collect the aluminum foil, it is preferable to use a drum-shaped cathode. The aluminum foil can be continuously collected by supplying an electrolytic solution between an anode and a cathode drum provided to face the anode, applying a direct current therebetween while rotating the cathode drum at a constant rate, to deposit an aluminum film on the surface of the cathode drum, peeling off the deposited aluminum film from the surface of the cathode drum, and wrapping the peeled-off aluminum film around a collecting drum. For example, after the aluminum film reaches a predetermined thickness, current application is stopped once, the aluminum film is peeled off by rotating the cathode drum, the peeled-off aluminum film is attached to the collecting drum, and the aluminum foil may be wound up while laminating the peeled-off aluminum film. The aluminum foil may also be collected as a peeled-off piece at the same time as the aluminum film may be peeled off.

EXAMPLES

Hereinafter, a suitable embodiment of the present disclosure will be specifically described based on Examples and Comparative Examples, but the present disclosure is not limited to these Examples.

(Preparation of Electrolytic Aluminum Foil; Examples 1 to 18 and Comparative Examples 1 to 11)

Electrolytic solutions were prepared, which were obtained by adding 1,10-phenanthroline (additive) into a solution obtained by mixing EMIC and $AlCl_3$ at a molar ratio of EMIC:$AlCl_3$=1:2 so that the electrolytic solutions had concentrations described in Table 1. The electrolytic solution was placed in an electrolysis vessel, and a titanium drum as a cathode (width: 100 cm, diameter: 200 cm, surface roughness Ra: 0.10 μm) and a 99.9% aluminum plate as an anode were placed in the electrolytic solution. Here, the aluminum plate as the anode was disposed to face the titanium drum as the cathode so that an interelectrode distance was set to 3 cm. In this case, a cross-sectional area between the cathode and the anode was 300 $cm^2$. The electrolytic solution was stirred while supplying an argon gas between the cathode and the anode and bubbling. For example, when an inflow rate is 15 L/min, a flow rate is 15000/300=50 cm/min. A current was applied until a film thickness was set to 10 μm under conditions of Table 1, to deposit an aluminum film on the cathode surface. After the end of the current application, the aluminum film deposited on the titanium drum was washed with ethanol and pure water, and peeled off from the titanium drum to collect an aluminum foil.

(Evaluation Method)

The arithmetic average height (Sa) and size of a crystal grain present in a cross-sectional surface for the obtained aluminum foil were measured, and the presence or absence of a dendritic deposit in an end portion was confirmed. In the production of the aluminum foil, the film formation efficiency and the collection rate were evaluated. Evaluation results are shown in Table 1. Since no inactive gas was supplied in Comparative Example 9, the movement of ions in the electrolytic solution was insufficient, no desired current flowed, and the aluminum film could not be formed. For this reason, this is described as "-" in Table 1.

(1) Arithmetic Average Height (Sa)

The arithmetic average heights (Sa) of the obtained aluminum foil were measured at any five places per 100 $cm^2$ of the area of the aluminum foil using an atomic force microscope (AFM). The average value thereof was taken as the arithmetic average height (Sa).

(2) Presence or Absence of Dendritic Deposit

The aluminum foil before peeling off was observed with the naked eye to confirm whether or not a dendritic deposit was present. A case where the deposit was absent was considered to be "good", and a case where the deposit was present was considered to be "poor".

(3) Average Diameter and Aspect Ratio of Crystal Grain

The obtained aluminum foil was irradiated with a focused ion beam from the surface of the aluminum foil toward the inside using a focused ion beam apparatus (SMI4050 manufactured by Hitachi High-Technologies Corporation) to obtain a secondary electron image. From the secondary electron image, the first maximum dimension x (μm) as measured in the thickness direction of the cross-sectional surface and the second maximum dimension y (μm) as measured in the width direction of the cross-sectional surface were measured for any ten or more crystal grains. The average value of x, and the average value of y were calculated, and then (x+y)/2 and x/y were calculated based on the average value of x and the average value of y. FIG. 1 and FIG. 2 show the cross-sectional surfaces of the aluminum foils of Example 1 and Comparative Example 5, respectively.

(4) Film Formation Rate

The thickness of the aluminum foil was measured by using a high-accuracy digital micrometer (MDH-25M manufactured by Mitutoyo Corporation). The thicknesses of the aluminum foil were measured at any five places per 100 $cm^2$ of the area of the aluminum foil, and the average value thereof was taken as the film thickness. The time between the start of the current application and the end of the current application was measured as the film formation time. The film formation rate was calculated by dividing the average film thickness by the film formation time.

The theoretical yield and the theoretical film formation rate were calculated using the following formulas based on Faraday's law. The atomic weight of Al was 26.98; the ionic valency was 3; and the Faraday constant was 96500 [$C \cdot mol^{-1}$].

Theoretical Yield=(Current Density×Film Formation Area×Film Formation Time×Atomic Weight of Al)/(Valency of Al Ion×Faraday Constant)

Theoretical Film Formation Rate=Theoretical Yield/(Film Formation Area×Density of Al×Film Formation Time)

The film formation efficiency was calculated by dividing the film formation rate by the theoretical film formation rate. When the film formation efficiency was 0.7 or more, it was considered to be a good film formation efficiency.

(5) Collection Rate

The weight (amount collected) of the obtained aluminum foil was measured. The collection rate was calculated by dividing the amount collected by the theoretical yield. When the collection rate was 80% or more, it was considered to be a high collection rate.

TABLE 1

|  | Temperature (° C.) | Concentration of additive (mM) | Current density (mA/cm$^2$) | Inactive gas flow rate (cm/min) | Arithmetic average surface height Sa (μm) | Presence or absence of dendrite |
|---|---|---|---|---|---|---|
| Example 1 | 50 | 20 | 60 | 100 | 0.07 | Good |
| Example 2 | 60 | | | | 0.08 | Good |
| Example 3 | 70 | | | | 0.082 | Good |
| Example 4 | 80 | | | | 0.08 | Good |
| Example 5 | 100 | | | | 0.09 | Good |
| Example 6 | 50 | 1 | | | 0.1 | Good |
| Example 7 | | 10 | | | 0.082 | Good |
| Example 8 | | 50 | | | 0.068 | Good |
| Example 9 | | 100 | | | 0.073 | Good |
| Example 10 | | 20 | 10 | | 0.15 | Good |
| Example 11 | | | 20 | | 0.11 | Good |
| Example 12 | | | 30 | | 0.09 | Good |
| Example 13 | | | 50 | | 0.075 | Good |
| Example 14 | | | 80 | | 0.072 | Good |
| Example 15 | | | 100 | | 0.08 | Good |
| Example 16 | | | 60 | 50 | 0.072 | Good |
| Example 17 | | | | 200 | 0.08 | Good |
| Example 18 | | | | 250 | 0.12 | Good |
| Comparative Example 1 | 25 | 0 | 60 | 100 | 0.13 | Poor |
| Comparative Example 2 | | 20 | | | 0.080 | Poor |
| Comparative Example 3 | 40 | | | | 0.07 | Poor |
| Comparative Example 4 | 110 | | | | 0.2 | Good |
| Comparative Example 5 | 50 | 0 | | | 0.36 | Good |
| Comparative Example 6 | | 0.5 | | | 0.32 | Good |
| Comparative Example 7 | | 110 | | | 0.16 | Good |
| Comparative Example 8 | | 20 | 110 | | 0.16 | Poor |
| Comparative Example 9 | | | 60 | 0 | — | — |
| Comparative Example 10 | | | | 30 | 0.20 | Poor |
| Comparative Example 11 | | | | 300 | 0.18 | Poor |

|  | Crystal grain | | | | Film formation rate (μm/min) | Film formation efficiency | Collection rate (%) |
|---|---|---|---|---|---|---|---|
|  | Average value of x (μm) | Average value of y (μm) | (x + y)/2 | x/y | | | |
| Example 1 | 4.0 | 1.4 | 2.7 | 2.9 | 0.98 | 0.79 | 95 |
| Example 2 | 4.4 | 1.5 | 3.0 | 2.9 | 1.02 | 0.82 | 92 |
| Example 3 | 4.5 | 1.3 | 2.9 | 3.5 | 1.04 | 0.84 | 90 |
| Example 4 | 4.6 | 1.3 | 3.0 | 3.5 | 1.05 | 0.84 | 88 |
| Example 5 | 4.3 | 1.6 | 3.0 | 2.7 | 1.00 | 0.80 | 87 |
| Example 6 | 4.2 | 1.6 | 2.9 | 2.6 | 0.96 | 0.77 | 86 |
| Example 7 | 4.0 | 1.5 | 2.8 | 2.7 | 0.96 | 0.77 | 85 |
| Example 8 | 3.5 | 1.4 | 2.5 | 2.5 | 1.05 | 0.84 | 88 |
| Example 9 | 3.3 | 1.2 | 2.3 | 2.8 | 1.10 | 0.89 | 90 |
| Example 10 | 4.6 | 1.3 | 3.0 | 3.5 | 0.16 | 0.77 | 100 |
| Example 11 | 4.5 | 1.3 | 2.9 | 3.5 | 0.31 | 0.75 | 100 |
| Example 12 | 4.5 | 1.2 | 2.9 | 3.8 | 0.51 | 0.82 | 99.8 |
| Example 13 | 4.4 | 1.2 | 2.8 | 3.7 | 0.93 | 0.90 | 98 |
| Example 14 | 3.7 | 1.2 | 2.5 | 3.1 | 1.40 | 0.84 | 90 |
| Example 15 | 3.6 | 1.1 | 2.4 | 3.3 | 1.70 | 0.82 | 88 |
| Example 16 | 3.9 | 1.4 | 2.7 | 2.8 | 0.98 | 0.79 | 96 |
| Example 17 | 4.0 | 1.6 | 2.8 | 2.5 | 1.00 | 0.80 | 98 |
| Example 18 | 4.3 | 1.5 | 2.9 | 2.9 | 0.98 | 0.79 | 97 |
| Comparative Example 1 | 5.3 | 1.3 | 3.3 | 4.1 | 0.67 | 0.54 | 67 |
| Comparative Example 2 | 4.7 | 1.1 | 2.9 | 4.3 | 0.65 | 0.52 | 68 |
| Comparative Example 3 | 4.2 | 1.0 | 2.6 | 4.2 | 0.62 | 0.50 | 79 |
| Comparative Example 4 | 5 | 1.8 | 3.4 | 2.8 | 0.60 | 0.48 | 72 |
| Comparative Example 5 | 6.5 | 2.1 | 4.3 | 3.1 | 0.96 | 0.77 | 77 |
| Comparative Example 6 | 4.5 | 2.2 | 3.4 | 2.0 | 0.96 | 0.77 | 78 |
| Comparative Example 7 | 4.3 | 1.4 | 2.9 | 3.1 | 1.10 | 0.89 | 77 |
| Comparative Example 8 | 3.7 | 0.9 | 2.3 | 4.1 | 1.74 | 0.76 | 75 |
| Comparative Example 9 | — | — | — | — | — | — | — |
| Comparative Example 10 | 3.5 | 0.8 | 2.2 | 4.4 | 0.65 | 0.52 | 68 |
| Comparative Example 11 | 4.2 | 1.0 | 2.6 | 4.2 | 0.80 | 0.64 | 78 |

As shown in Table 1, in Examples 1 to 18, the arithmetic average height (Sa) of the surface is 0.15 μm or less, and when, for the size of the crystal grain present in the cross-sectional surface, the first maximum dimension as measured in the thickness direction of the cross-sectional surface is x (μm), and the second maximum dimension as measured in the width direction of the cross-sectional surface is y (μm), x and y satisfy the following formulas (1) and (2):

$$(x+y)/2 \leq 3 \text{ μm} \quad (1); \text{ and}$$

$$1 \leq x/y \leq 4 \quad (2).$$

Therefore, it was found that the aluminum foil includes the smooth surface and the end portion containing no dendritic deposit, and the aluminum foil can be obtained at a high collection rate without causing the aluminum film to break or flake off when the aluminum film is peeled off from the cathode.

On the other hand, in Comparative Example 1, (x+y)/2 was 3.3 μm and x/y was 4.1, and thus the dendritic deposit was confirmed in the end portion. Accordingly, the result was that the film formation efficiency and the collection rate were poor.

x/y in Comparative Example 2 and x/y in Comparative Example 3 were 4.3 and 4.2, respectively, and thus the dendritic deposit was confirmed in the end portion. Accordingly, the result was that the film formation efficiency and the collection rate were poor.

In Comparative Example 4, it was found that the arithmetic average height of the surface was 0.2 μm and that the smooth properties were poor. In Comparative Example 4, the temperature of the electrolytic solution was as high as 110° C., and thus the aluminum film was nonuniformly formed and the result was that the film formation efficiency and the poor collection rate were poor.

It was found that the arithmetic average heights of the surfaces in Comparative Examples 5 and 6 were 0.36 μm and 0.32 μm, respectively, and that the smooth properties were poor. In Comparative Example 5, no additive was added, and in Comparative Example 6, the concentration of the additive was as low as 0.5 mM, and thus the strength of the aluminum film was low, and the result was that the collection rate was poor.

In Comparative Example 7, it was found that the arithmetic average height of the surface was 0.16 μm and that the smooth properties are poor. In Comparative Example 7, the concentration of the additive was as high as 110 mM, and thus the aluminum film was hard and brittle, and the result was that the collection rate was poor.

In Comparative Example 8, the arithmetic average height of the surface was 0.16 μm and x/y was 4.1, and thus the smooth properties were poor. Furthermore, a dendritic deposit was confirmed in the end portion, and the result was that the collection rate was poor.

In Comparative Example 10, the arithmetic average height of the surface was 0.20 μm and x/y was 4.4, and thus the smooth properties were poor. Furthermore, a dendritic deposit was confirmed in the end portion, and the result was that the film formation efficiency and the poor collection rate were poor.

In Comparative Example 11, the arithmetic average height of the surface was 0.18 μm and x/y was 4.2, and thus the smooth properties were poor. Furthermore, a dendritic deposit was confirmed in the end portion. The flow rate of the inactive gas was too fast at 300 cm/min, and thus the aluminum film was apt to be peeled off from the cathode during electrodeposition, and the result was that the film formation efficiency and the poor collection rate were poor.

As described above, the electrolytic aluminum foil according to the present disclosure includes a surface having an arithmetic average height (Sa) of 0.15 μm or less, wherein when, for the size of the crystal grain present in the cross-sectional surface, the first maximum dimension as measured in the thickness direction of the cross-sectional surface is x (μm), and the second maximum dimension as measured in the width direction of the cross-sectional surface is y (μm), x and y satisfy the following formulas (1) and (2):

$$(x+y)/2 \leq 3 \text{ μm} \quad (1); \text{ and}$$

$$1 \leq x/y \leq 4 \quad (2).$$

Therefore, the electrolytic aluminum foil is a high-quality electrolytic aluminum foil including a smooth surface and an end portion containing no dendritic deposit.

The present application claims priority to Japanese Patent Application No. 2016-226650 filed in Japan on Nov. 22, 2016, which is hereby incorporated by reference in its entirety.

What is claimed is:

1. An electrolytic aluminum foil comprising a surface having an arithmetic average height Sa of 0.15 μM or less, wherein the arithmetic average height Sa is a parameter obtained by three-dimensionally extending an arithmetic average roughness Ra, wherein the arithmetic average roughness Ra is a two-dimensional parameter, wherein when, for a size of a crystal grain present in a cross-sectional surface, a first maximum dimension as measured in a thickness direction of the cross-sectional surface is x, and a second maximum dimension as measured in a width direction of the cross-sectional surface is y, x and y satisfy the following formulas (1) and (2):

$$(x+y)/2 \leq 3 \text{ μm} \quad (1); \text{ and}$$

$$1 \leq x/y \leq 4 \quad (2).$$

2. A method for producing the electrolytic aluminum foil according to claim 1, the method comprising:
supplying an electrolytic solution into an electrolysis vessel including a cathode and an anode;
electrodepositing an aluminum film on the cathode;
peeling off the electrodeposited aluminum film from the cathode to provide the electrolytic aluminum foil,
wherein the electrolytic solution contains a molten salt containing an alkyliniidazolium halide and an aluminum halide, and 1,10-phenanthroline;
a concentration of the 1,10-phenanthroline is 1 to 100 mM in the electrolytic solution;
its electrodepositing the aluminum film, a temperature of the electrolytic solution is 50 to 100° C., and a current density is 10 to 100 mA/cm$^2$; and
electrodepositing the aluminum film is performed under a condition where an inactive gas is injected at a flow rate of 50 to 250 cm/min between the cathode and the anode.

3. The method for producing the electrolytic aluminum foil according to claim 2, wherein the inactive gas is argon.

4. The method for producing the electrolytic aluminum foil according to claim 2, wherein an arithmetic average roughness (Ra) of the cathode is 0.10 to 0.40 μm.

* * * * *